United States Patent [19]

MeGushion

[11] Patent Number: 5,306,052
[45] Date of Patent: Apr. 26, 1994

[54] TUBING UNION WITH A TORQUE TRANSFER FITTING

[76] Inventor: Kevin D. MeGushion, 1448 19th St., Santa Monica, Calif. 90404

[21] Appl. No.: 990,575

[22] Filed: Dec. 15, 1992

[51] Int. Cl.$^5$ ............................................. F16L 35/00
[52] U.S. Cl. .................... 285/328; 285/330; 285/913; 285/354
[58] Field of Search ............... 285/913, 914, 330, 328, 285/354; 403/364, 341, 342

[56] References Cited

U.S. PATENT DOCUMENTS

| | | | |
|---|---|---|---|
| 3,194,588 | 7/1965 | Buckey et al. | 285/914 |
| 3,623,753 | 12/1969 | Henery | 285/913 |
| 4,665,960 | 5/1987 | Brzezicki et al. | 285/914 |
| 5,054,822 | 10/1991 | McGushion | 285/330 |
| 5,060,987 | 10/1991 | Miller | 285/328 |
| 5,066,051 | 11/1991 | Weigl et al. | 285/330 |
| 5,163,721 | 11/1992 | Babuder | 285/330 |

FOREIGN PATENT DOCUMENTS

| | | | |
|---|---|---|---|
| 3812211 | 11/1989 | Fed. Rep. of Germany | 285/330 |
| 1404743 | 6/1988 | U.S.S.R. | 285/330 |
| 151046 | 9/1920 | United Kingdom | 285/330 |

Primary Examiner—Eric K. Nicholson
Attorney, Agent, or Firm—Donald D. Mon

[57] ABSTRACT

In a compression type union for compressing two tubing segments against an intervening washer, a male nut, a female nut, and a pair of caps, the caps having interengaging tongues and slots. The nuts bear against respective caps, and the caps bear against respective heads of the tubing segments. The caps being non-integral with either tubing segment or with either nut, and there is no interengagement of any kind between the nuts and the tubing segments. The union can be joined without concern for positioning either of the nuts.

3 Claims, 1 Drawing Sheet

TUBING UNION WITH A TORQUE TRANSFER FITTING

FIELD OF THE INVENTION

This invention relates to compressively assembled unions of two tubing segments, and in particular to a union that includes a torque transfer fitting which isolates the tubing segments from rotational forces.

BACKGROUND OF THE INVENTION

Especially in the field for piping of hazardous gases, it is customary to couple adjacent segments of tubing by means of a compression-type union. The tubing is generally made of metal, and each segment terminates at a hard peripheral sealing surface. The well-known VCR (vacuum compression rod) union is well-known and widely used in chip manufacturing installations, and exemplifies this field.

It is important that abutting sealing faces not be scarred, even minutely, by relative rotational movement during assembly. This is a uniform objective which is not always fulfilled. To avoid the unfavorable result, a purely compressive force should be exerted to make the seal.

There are other problems with conventional VCR fittings. There is a pervasive problem that, even with great care, residual twisting forces may be set into a completed piping structure. This frequently results in an untidy appearance of moderately out of line pipes, and worse, stored torsional forces which might ultimately lead to loosening of the unions. This can be a very serious consequence.

Attempts have been made to avert these consequences by placing in the union an anti-twist member. Such members are generally characterized as a compression cap with a tongue. One member of a threaded joinder abuts against the cap, and the tongue fits in an axial slot on the other threaded member. The slotted member is held against rotation, and the other member tightened down. This is a workable concept, shown in McGushion U.S. Pat. No. 5,054,822 filed Oct. 8, 1991.

Disadvantages of this earlier construction are the need to slot one of the threaded members with consequent extremely difficult deburring requirements, and that one of the threaded members, generally the male threaded member must carefully and very accurately be held against rotation or a counter-torque could be exerted in the system.

It is an object of this invention to provide a torque transfer fitting for a compression-type union which need not be restrained at either of the threaded members, which can utilize unmodified male and female nut members which do not require deburring, which can utilize two identical parts, and which parts can be so short that they can be manufactured in an inexpensive press operation, rather than having to be machined.

BRIEF DESCRIPTION OF THE INVENTION

A union according to this invention couples a first and a second tubing segment together. Each segment has a central passage, and a rigid sealing bead on its end.

A sealing washer has a hole therethrough aligned with the tubing passages, so that the sealing beads can be compressed against its opposite sides to make the seal.

Each tubing segment has a compression shoulder facing 4-n the direction away from the sealing bead.

A male threaded nut and a female threaded nut each has a compression shoulder which face each other when the nuts are joined.

According to a feature of this invention, a torque transfer fitting is placed around the tubings, between the compression shoulders on the tubing segments and on the nut member.

The torque transfer fitting comprises a pair of complementary caps. Each cap has a central disc with a central aperture therethrough, at least one axially extending torque, and at least one axially extending slot. The tongue of one cap slides and closely fits in the slot of the other cap, and the caps are thereby restrained against relative rotation. Each disc has a pair of oppositely facing compression faces. One of said faces bears against the compression shoulder of one of the threaded members. The other face bears against the compression shoulder of one of the tubing segments.

When the threaded members are tightened down, they compress the assembled fitting, whose caps can not rotate relative to one another. Accordingly, no relative torque can be executed between the tubing segments. The threaded members do not make any contact whatever with the tubing segments. Accordingly, the tubing union can be set accurately with literally no care for relative rotation of the tubing segments, because there is none.

The above and other features of this invention will be fully understood from the following detailed description and the accompanying drawings.

DETAILED DESCRIPTION OF THE DRAWINGS

Figure 2:
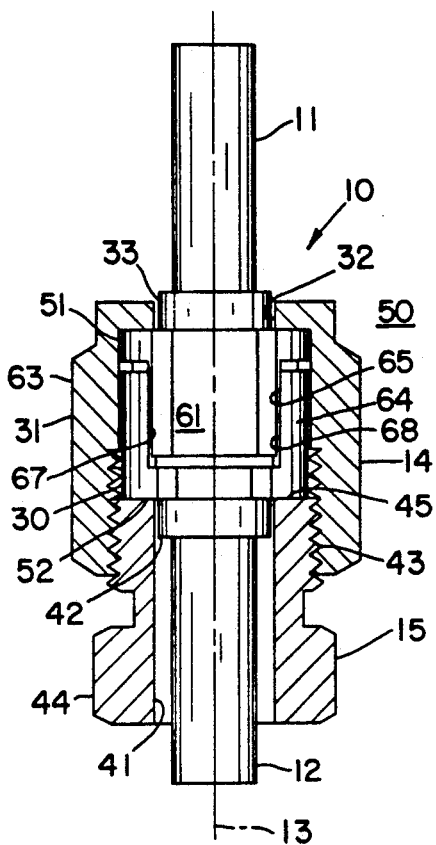
FIG. 2 is a partial axial cross section of FIG. 1.
Figure 3:
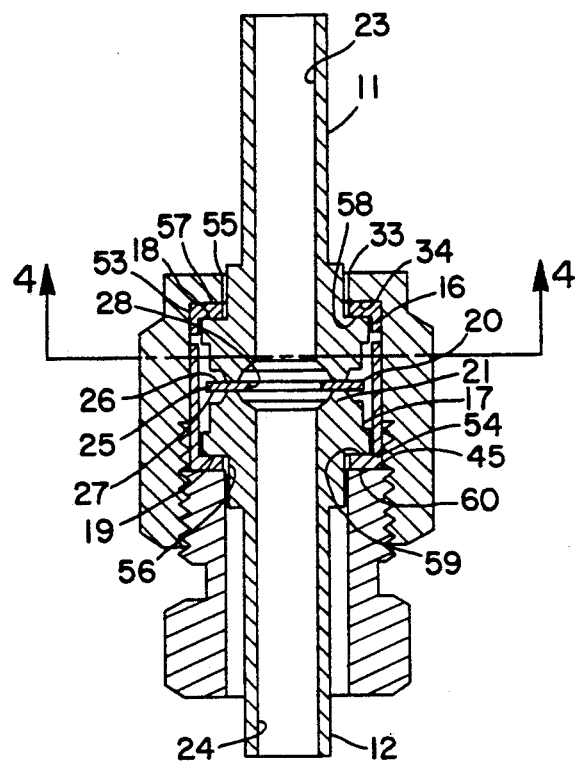
FIG. 3 is a full axial cross section of FIG. 1.
Figure 1:
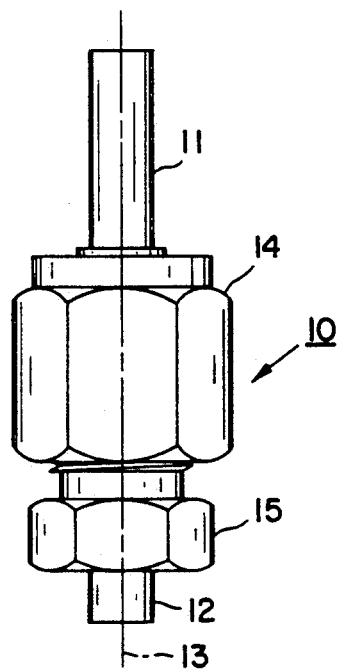
FIG. 1 is a side view of a compression fitting incorporating the fitting.
Figure 4:
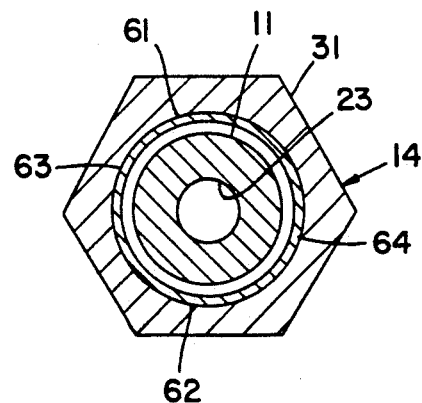
FIG. 4 is a cross-section taken at line 4—4 in FIG. 3.

FIG. 1 shows a union 10 joining a first tubing segment 11 and second tubing segment 12. The union has a central axis 13. The union includes an internally threaded female nut 14 and an externally threaded male nut 15.

Tubing segments 11 and 12 are identical at their joined ends. They respectively include a head 16, 17 a compression shoulder 18, 19 a sealing bead 20, 21 and central passages 23, 24.

A sealing washer 25 has oppositely facing sealing faces 26, 27 in opposition to sealing beads 20, 21. A central orifice 28 passes through the sealing washer.

The heads and the sealing washer are made of metal which is compatable with fluids intended to be conveyed. Various grades of stainless steel are often utilized. While both beads and the washer are strong and rigid, the localized compression forces will result in fluid-sealing conformity between them. Because these parts are made to a very high precision, such accommodation is always very minor, especially because there will have been only insignificant, if any, galling forces exerted.

The female nut 14 has a set of internal threads 30, a set of wrench-engaging surfaces 31, usually a hexagonal array, a central opening 32 with a diameter larger than the tubing segments external diameter. This leaves a clearance 33 between the tubing segment 11 and nut 14. A compression shoulder 34 faces toward compression shoulder 18.

Male nut 15 has a central passage 41 with a diameter larger than that of the external diameter of tubing segment 12, so as to leave a clearance 42. It has a set of external threads 43 which engage threads 30 of the female nut to assemble the union. It further includes an array of wrench engaging surfaces 44, preferably hexagonal. A compression face 45 faces toward compression shoulder 19 on tubing segment 12.

A torque transfer fitting 50 is fitted around the tubing segments and between compression shoulders 34 and 45 of the nuts. The fitting comprises two caps 51,52 which are preferably identical to one another.

The caps 51,52 each also includes a central disc 53,54 with central orifices 55,56 each with compressive faces 57, 58 and 59,60. The compressive faces are fitted between the compressing faces and shoulders on the respective puts and tubing segment heads, in a compressive stack.

Caps 51,52 each includes a peripheral skirt, from which a pair of tongues 61,62 and 63, axially extend. Between these tongues there are formed respective slots 65,66 and 67,68. The tongues of one cap are slidably fitted into the slots of the other, and their peripheral dimensions and identification. Their edges are parallel to the central axis. Therefore the caps can move axially relative to one another, but cannot rotate relative to one another. Dimensions are carefully controlled to keep any movement due to tolerances at a minimum. The skirts make a close fit with the respective heads so as to align the tubing segments.

It is preferable for the caps to be identical to one another, because this makes for economy in manufacture and interchangability. Also more or fewer tongues and slots than two may be used.

The assembly of the union can be seen from the foregoing. The caps are placed over the heads and the nuts over them. Then the nuts are tightened together. The compressive force is taken by the caps and transmitted to the heads and sealing beads, thereby making the joinder. All rotational reaction occurs between the nuts and the caps. None is transmitted to the tubing segments. A purely axial compressive seal results.

This invention is not to be limited by the embodiment shown in the drawings and described in the description, which is given by way of example and not of limitation, but only in accordance with the scope of the appended claims.

I claim:

1. In a compression-type union having a central axis, said union joining two tubing segments together, each tubing segment having a central passage, and at an end to be joined a head, on said head a peripheral sealing bead and a compression shoulder, said compression shoulder and sealing bead facing in opposite axial directions, and a sealing washer placed between said sealing beads, said sealing washer including a pair of opposite facing sealing faces and a central orifice, an externally threaded male nut having external wrench engaging surfaces, an external thread and an internal compression shoulder and a central passage, a female nut having external wrench engaging surfaces, an internal thread to engage said external thread, an internal compression shoulder and a central orifice, said orifices in said nuts leaving a clearance between said nuts and said tubing segments, the improvement comprising:

a transfer fitting, said fitting including a pair of caps, each cap including a disc having a central opening and a pair of opposite facing faces, a peripheral skirt extending axially away from said disc, one of aid caps having an axially extending tongue, and the other having an axially extending slot, the edges of the tongue and slot all being parallel to the central axis, the lateral dimensions of the tongue and slot being substantially equal so the caps can move axially relative to one another, but not rotationally, said skirts fitting around said heads to align them, said caps being non-integral with either tubing segment or with either nut, and neither of said nuts having any interengagement of any kind with said tubing segments said tongue and slot interengaging, said nuts clearing said tubing segments, whereby tightening the nuts together presses the caps toward one another, and through them compresses both of the sealing beads against the sealing washer, without exertion of relative counter-rotational forces at the sealing beads.

2. A union according to claim 1 in which both of said caps have a tongue and a slot.

3. A union according to claim 2 in which there are provided two tongues and two slots in each cap, all of said slots and tongues extending for approximately 90 degrees around the periphery of the caps.

* * * * *